(12) United States Patent
Smoot et al.

(10) Patent No.: US 7,912,815 B1
(45) Date of Patent: Mar. 22, 2011

(54) METHOD AND SYSTEM OF AUTOMATICALLY MONITORING A STORAGE SERVER

(75) Inventors: Peter L. Smoot, San Jose, CA (US); Barry P. Schwartz, San Jose, CA (US); Nagender Somavarapu, Bangalore (IN); Brian M. Hackworth, San Jose, CA (US); Benjamin B. Swartzlander, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 687 days.

(21) Appl. No.: 11/366,042

(22) Filed: Mar. 1, 2006

(51) Int. Cl.
*G06F 7/00* (2006.01)
*G06F 17/00* (2006.01)
*G06F 15/16* (2006.01)

(52) U.S. Cl. .................. 707/659; 711/162

(58) Field of Classification Search .......... 707/654, 707/659; 711/162
See application file for complete search history.

(56) References Cited

U.S. PATENT DOCUMENTS

| 5,276,867 | A | * | 1/1994 | Kenley et al. ............ 707/204 |
| 5,794,255 | A | * | 8/1998 | Hayashi et al. ............ 707/205 |
| 5,819,292 | A | | 10/1998 | Hitz et al. |
| 5,819,296 | A | * | 10/1998 | Anderson et al. ............ 707/204 |
| 5,832,526 | A | * | 11/1998 | Schuyler ............ 707/205 |
| 5,893,116 | A | * | 4/1999 | Simmonds et al. ............ 707/201 |
| 2002/0060962 | A1 | * | 5/2002 | Kase ............ 369/47.11 |
| 2002/0091965 | A1 | * | 7/2002 | Moshayedi ............ 714/8 |
| 2004/0078419 | A1 | * | 4/2004 | Ferrari et al. ............ 709/201 |
| 2004/0167972 | A1 | * | 8/2004 | Demmon ............ 709/219 |
| 2005/0033911 | A1 | * | 2/2005 | Kitamura et al. ............ 711/111 |
| 2006/0218362 | A1 | * | 9/2006 | McManis ............ 711/162 |
| 2006/0248272 | A1 | * | 11/2006 | del Rosario et al. ............ 711/114 |
| 2007/0067585 | A1 | * | 3/2007 | Ueda et al. ............ 711/162 |

FOREIGN PATENT DOCUMENTS

JP 2002-157823 A 5/2002

OTHER PUBLICATIONS

Betty Salzberg and Vassilis J. Tsotras. Comparison of Access Methods for Time-Evolving Data. ACM Computing Surveys, vol. 31, No. 2, Jun. 1999, pp. 158-221.*
The MathWorks, Using Matlab Graphics, Version 5, Dec. 1996, Title Page, Preface and Chapter 4.*

* cited by examiner

*Primary Examiner* — Tony Mahmoudi
*Assistant Examiner* — Brian E Weinrich
(74) *Attorney, Agent, or Firm* — Perkins Coie LLP

(57) ABSTRACT

A monitoring server remotely communicates with a storage server in order to monitor utilization of storage space of a write out-of-place file system on the storage server, the file system including a persistent point-in-time image (PPI) of its active file system, the PPI including at least part of the active file system, but does not duplicate said part of the active file system.

15 Claims, 7 Drawing Sheets

Volume Overwrite Rate

Help (?) Print
14 Sep 09:36

| Summary | Appliances | vFilers | Aggregates | File Systems | SANs | LUNs | SRM | Streaming | Scripts | Events |

Global

Volumes 1-20 of 150    View  Volume Overwrite Rate    Page 1|2|3|4|5|6|7|8▶ Show All

| | Volume | Aggregate | Filer | Overwrite Rate ▼ | Reservation Avail | Days to Full |
|---|---|---|---|---|---|---|
| ☐ | vol0 | vol0 | tweety.lab.netapp.com | 609 MB | 0 bytes | less than a day |
| ☐ | vol0 | vol0 | haroto.lab.netapp.com | 178 MB | 0 bytes | less than a day |
| ☐ | vol0 | vol0 | astroboy.lab.netapp.com | 162 MB | 0 bytes | less than a day |
| ☐ | vol0 | vol0 | remington.lab.netapp.com | 139 MB | 0 bytes | less than a day |
| ☐ | vol0 | vol0 | winchester.lab.netapp.com | 127 MB | 0 bytes | less than a day |
| ☐ | vol0 | vol0 | fryer.lab.netapp.com | 120 MB | 0 bytes | less than a day |
| ☐ | vol0 | vol0 | barbera.lab.netapp.com | 119 MB | 0 bytes | less than a day |
| ☐ | vol0 | vol0 | felix.lab.netapp.com | 116 MB | 0 bytes | less than a day |
| ☐ | vol0 | vol0 | wessen.lab.netapp.com | 103 MB | 0 bytes | less than a day |
| ☐ | vol0 | aggr0 | smith.lab.netapp.com | 102 MB | 0 bytes | less than a day |
| ☐ | vol0 | vol0 | deuxme.lab.netapp.com | 101 MB | 0 bytes | less than a day |
| ☐ | vol0 | vol0 | mauser.lab.netapp.com | 88.4 MB | 2.34 MB | less than a day |

401  402  403  404  405  406

FIG. 4

METHOD AND SYSTEM OF AUTOMATICALLY MONITORING A STORAGE SERVER

A portion of the disclosure of this patent document contains material which is subject to copyright protection. The applicant has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to storage system management, and more particularly, to automatically monitoring a storage server.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Independent Disks (RAID). Enterprise-level filers are made by Network Appliance, Inc. of Sunnyvale, Calif. (NetApp®). In a SAN context, the storage server provides clients with block-level access to stored data, rather than file-level access. Some storage servers are capable of providing clients with both file-level access and block-level access, such as certain Filers made by NetApp.

One of the primary jobs of a storage system administrator is to monitor how the space is used in the storage system, predict when various storage pools will be exhausted, and react to situations where some operations failed due to lack of storage space. In the days of simple disk drives and file systems, this task was easy. Modern filers, however, are much more complicated, especially when they are used for storing Logical Unit Numbers (LUNs).

A filer may have a number of aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit, such as a complete file system. A "file system" is an independently managed, self-contained, hierarchal set of data units (e.g., files, blocks or LUNs). A file system may be a volume, for example. Although a volume or file system (as those terms are used herein) may store data in the form of files, that is not necessarily the case. That is, a volume or file system may store data in the form of other units, such as blocks or LUNs.

A traditional volume has a fixed, one-to-one relationship with its containing aggregate (i.e., exactly coextensive with one aggregate). Consequently, there is a fixed relationship between each traditional volume and the disks that are associated with it. This fixed relationship means that each volume has exclusive control over the disks that are associated with the volume. Only the volume associated with the disk can read and/or write to the disk. Unused space within the disks associated with the volume cannot be used by another volume. Thus, even if a volume is only using a fraction of the space on its associated disks, the unused space is reserved for the exclusive use of the volume. Thus, a traditional volume is a space-guaranteed volume in that every byte of the volume is already physically allocated from the underlying aggregate. In this configuration, the system administrator would only need to see how much space is available in the volume. If there is free space, there is little risk of a write failure. If there is too little free space, the storage administrator may need to delete some files to recover space. Storage administrators tend to reserve more space than actually needed to avoid ever running out space. As it turns out frequently, much of the reserved space is wasted.

To improve space utilization, a flexible volume may be used. A flexible volume is analogous to a traditional volume, in that it is managed as a file system; but unlike a traditional volume, a flexible volume is treated separately from the underlying physical storage that contains the associated data. A "flexible volume" is, therefore, a set of stored data associated with one or more mass storage devices, such as disks, which obtains its storage from an aggregate, and which is managed as an independent administrative unit, such as a single file system, but which is flexibly associated with the underlying physical storage. Flexible volumes allow the boundaries between aggregates and volumes to be flexible, such that there does not have to be a one-to-one relationship between a flexible volume and an aggregate. An aggregate can contain multiple flexible volumes. Hence, flexible volumes can be very flexibly associated with the underlying physical storage block characteristics. Further, to help reduce the amount of wasted storage space, any free data block in an aggregate can be used by any flexible volume in the aggregate. A flexible volume can be grown or shrunk in size. Furthermore, blocks can be committed to flexible volumes on-the-fly from available storage. A flexible volume may be a non-space-guaranteed volume, which means that not every byte of the volume is physically allocated from the underlying aggregate(s). A flexible volume may be created with its size larger than the physical size of the underlying aggregate(s). This situation is called aggregate overcommitment. Aggregate overcommitment provides the type of flexibility that is particularly useful to a storage provider. Using aggregate overcommitment, it may appear that more storage than is actually available from a given aggregate is provided. This arrangement may be useful if a system administrator is asked to provide greater amount of storage than he knows will be used immediately. Alternatively, if there are several volumes that sometimes need to grow temporarily, the volumes can share the available space with each other dynamically.

Many storage servers also have the ability to generate a read-only, persistent point-in-time image (PPI) of data set, such as a volume, file, or logical unit number (LUN). A PPI captures the exact state of data in a data set at the point in time that the PPI was taken. This allows the state of the data set to be restored from the PPI in the event of, for example, a catastrophic failure of the storage system or corruption of data.

An example of a PPI is a Snapshot™ such as may be created using SnapManager® from NetApp. The term "Snapshot" is used herein without derogation of the trademark rights of Network Appliance, Inc. NetApp's Snapshot mechanism is implemented, at least in part, in its DATA ONTAP® operating system, which implements a write out-of-place file system. The write out-of-place file system, known as WAFL®, writes all modified data to new locations on disk, instead of overwriting the old data. Instead of duplicating disk blocks that are the same in a PPI as in the active file system, a NetApp Snapshot shares these data blocks with the active file system. When blocks in the active file system are modified or removed, new blocks are added into the active file system to replace the old ones because of the file system's write out-of-place property. The old blocks, although removed from the active file system, are still being held by some Snapshots, thus, causing the Snapshots area to consume disk space. This consumes free space from the volume and causes the Snapshot area to grow. A storage administrator may periodically release some obsolete Snapshots to return free spaces back to the file system. However, the storage administrator needs to closely monitor the file system and Snapshots.

Although modern storage servers provide more flexible ways to manage a file system, such flexible ways require a storage administrator's close and careful monitoring of the storage server, which requires constant attention and intensive manual operations and calculations under the current storage management scheme. Traditionally, the operating system of a storage server provides commands for system administrators to monitor and manage the server. For example, Unix and DOS operating systems provide command lines that allow an administrator to list the content of a directory, size of a file, free spaces available to a volume, etc. Modern operating systems usually provide GUI tools to make the monitoring and managing of a complicated storage server easier. An example of a GUI based storage server monitoring and management system is the DataFabric® Manager (DFM) of Network Appliance, Inc. However, these GUI based storage server managers do not provide systematic and automatic tools for advanced space monitoring and management.

SUMMARY OF THE INVENTION

The present invention includes a method and processing system for automatically monitoring a storage server. The method comprises remotely communicating with a write out-of-place file system on a storage server. The file system includes an active file system and a persistent point-in-time image (PPI) of the active file system. The PPI includes at least part of the active file system, but does not duplicate that part of the active file system. The method further comprises automatically monitoring utilization of storage space of the file system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 shows a display screen of a GUI organizing and displaying information with respect to a list of volumes' data overwrite rate;

DETAILED DESCRIPTION

A method and system for automatically monitoring a storage server remotely via a network are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
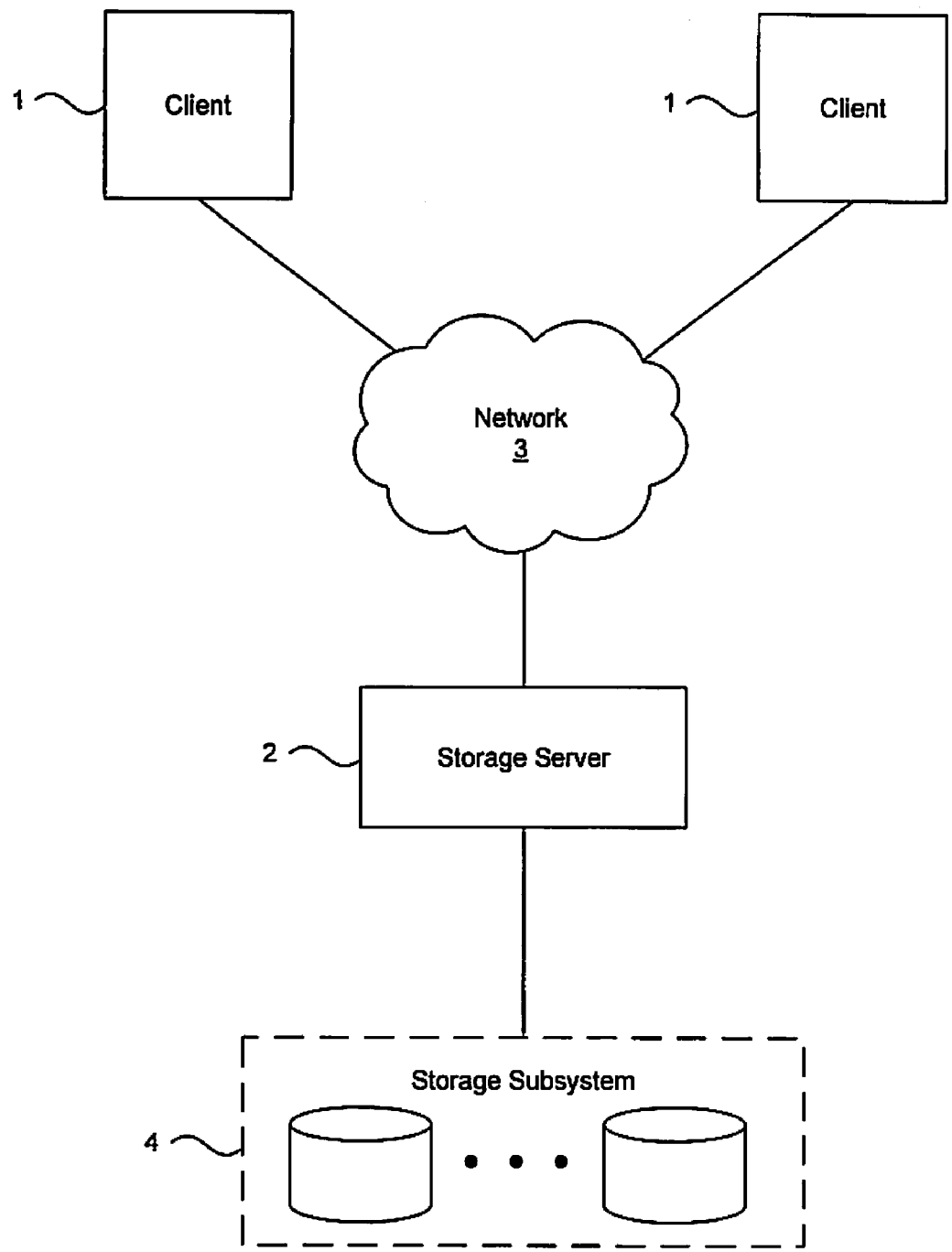
FIG. 1 shows a network environment in which the invention may be implemented.

FIG. 1 shows a network environment in which the invention may be implemented. A storage server 2 is coupled locally to a storage subsystem 4, which includes multiple mass storage devices (e.g., disks). The storage server 2 is also coupled through a network 3 to a number of storage clients 1 (hereinafter simply "clients"). The storage subsystem 4 is managed by the storage server 2. The storage server 2 receives and responds to various read and write requests from the clients 1, relating to volumes, LUNs, files, and/or other units of data stored in (or to be stored in) the storage subsystem 4.

Each of the clients 1 may be, for example, a conventional personal computer (PC), workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

The storage subsystem 4 may store data represented in an active file system of the storage server 2 as well as one or more PPIs. The "active" file system is the current working file system, where data may be modified or deleted, as opposed to a PPI, which is a read-only copy of the file system saved at a specific time. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

To facilitate the following description in an exemplary embodiment, it is assumed that the storage server 2, when writing modified data to disk, does not write the modified data blocks "in place". Rather, whenever a block of data is modified, the block is written to a new physical location on disk; this property is referred to herein as "write out-of-place".

Figure 2:
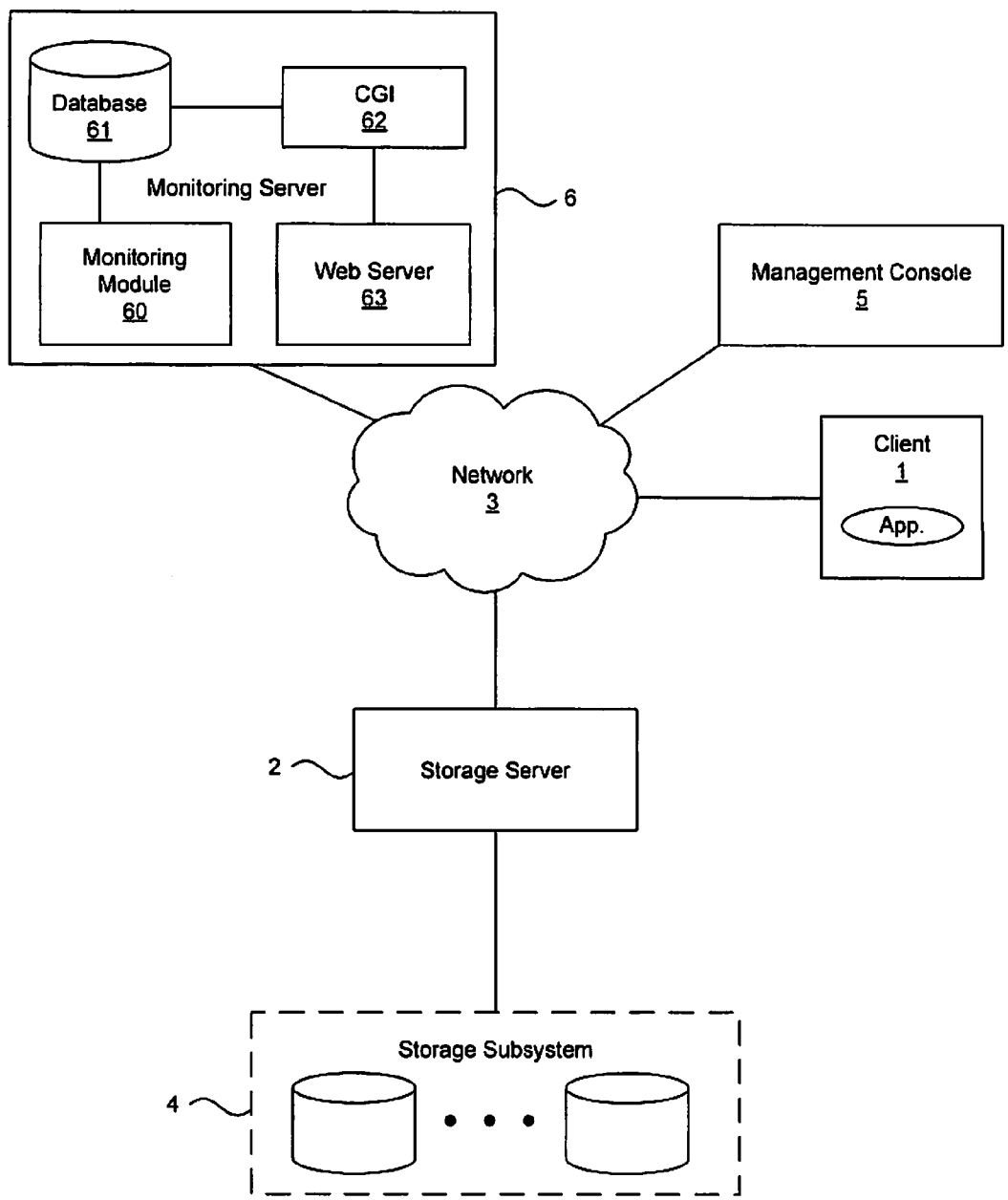
FIG. 2 shows an architecture of a storage server monitoring system according to an embodiment.

FIG. 2 shows an architecture of a storage server monitoring system according to an embodiment of the invention. A monitoring server 6 is configured to monitor storage server 2 across a network 3. The monitoring server 6 has a monitoring module 60 which periodically requests, from the storage server 2, specified types of data with respect to the status of the storage server and file systems on the server, and stores these data in a database 61. A management console 5 operated by a storage administrator communicates with the database 61, through the Web server 63 and the Common Gateway Interface (CGI) 62. The storage administrator may retrieve monitoring data, i.e., data regarding the status of the storage server and file systems on the server, from the database 61. The management console 5 may generate events and/or reports according to these data to help the storage administrator manage the storage server 2. For example, a report may tell the storage administrator whether he can delete some PPIs to free up space when he gets an event warning that a volume is nearing full. Based on the report, the administrator may manage the storage server 2 (i.e., deleting some snapshots) via the management console 5 through the network 3. Note that an event may be generated by the monitoring process whether or not the management console 5 is running. For example, a generated event may be stored first in the monitoring server 6 and sent to the management console 5 as soon as a storage administrator logs into the system.

Monitoring Process

The following sections describe details of the monitoring processes of monitoring module 60, according to certain embodiments of the invention. Although the description uses a filer as an example to describe the automatic monitoring process, the rationales and principles are the same for other types of storage servers. Thus, the description does not in any way limit the scope of the present invention.

1. Monitoring Free Spaces Available to a Volume

For a space-guaranteed volume, the size of free space available to the volume is simply the volume's total size less the size of the volume's used space. For a non-space-guaranteed volume, because not every byte of the volume is guaranteed (physically allocated), the size of free space available to the volume is the minimum of the size of the logical free space available to the volume and the size of the physical free space available in the underlying aggregate. Essentially, the volume size acts as a quota, and the aggregate is the actual source of free space.

Storage servers usually provide an Application Program Interface (API) through which an outside application may request server data. The storage server 2, as shown in FIG. 2, can provide such an API. A volume's current size may be obtained by calling a volume-list-info function via the API. For a traditional volume, the returned size is the volume's physical size; and for a flexible volume, the returned size is the volume's logical size. Similarly, an aggregation-list-info function may be called to return an aggregate's status, which includes the size of free space available to the aggregate.

2. Monitoring a Volume's Data Overwriting Rate

To a storage server implemented with write out-of-place file systems, the daily overwrite rate of a volume on such a storage server may be obtained by calling a PPI-delta-info function. The function returns consumed-size, the amount of size consumed between two snapshots or a PPI and active file system, and elapsed-time, the time elapsed between the two specified PPIs or the PPI and the active file system. Thus, a volume's daily data overwriting rate may be calculated by calling the function with the oldest PPI and the active volume. For example, if the consumed-size is 100 MB and the elapsed-time is 2 days, then the daily data overwriting rate is 50 MB/day. Note that the elapsed-time may be returned in seconds, minutes, or other time units. The above description uses days just for the purpose of illustration, not limitation.

The daily data overwriting rate of a volume may be calculated and stored in a database periodically as historical data. In a volume with PPIs created daily, this is approximately the rate at which the PPI area grows and the rate at which the space of a volume is depleted. Thus, this parameter is a useful reference for a storage administrator to manage a volume, i.e., to enlarge the size of a volume.

3. Monitoring PPIs

Information on the status of a PPI may be obtained by calling the PPI-list-info function via API. Such information can include, for example: the size of the PPI, the most recent access time to the PPI, whether the PPI is being used by any application, and applications that are dependent on this PPI. Depending on these data, a storage administrator may make decisions with respect to whether and which PPI may be deleted. For example, if a PPI is being used by any application, it is better to keep it at least temporarily; otherwise, if a PPI has not been accessed for a long time, and it is not being used or depended on by any application, it may be deemed safe to delete the PPI to return its storage space to the active file system.

4. Predicting Write Failures

Figure 3:
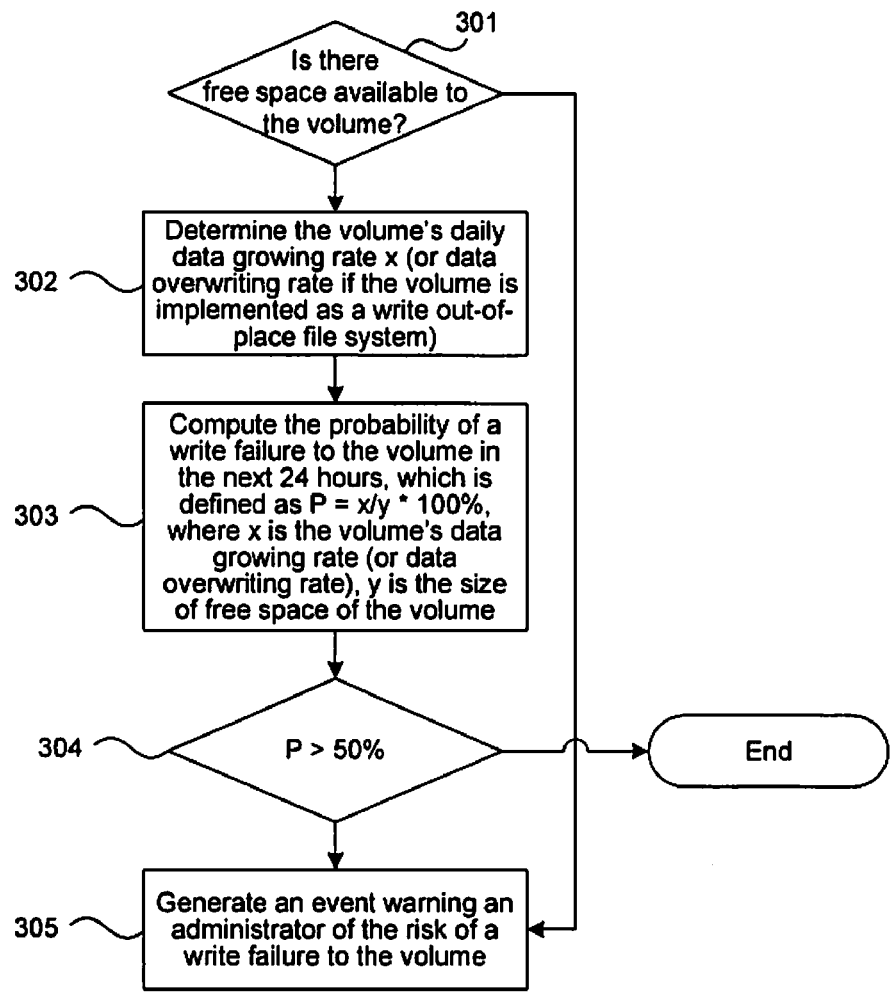
FIG. 3 is a flow diagram illustrating a process of predicting a write failure to a volume.
Figure 5:
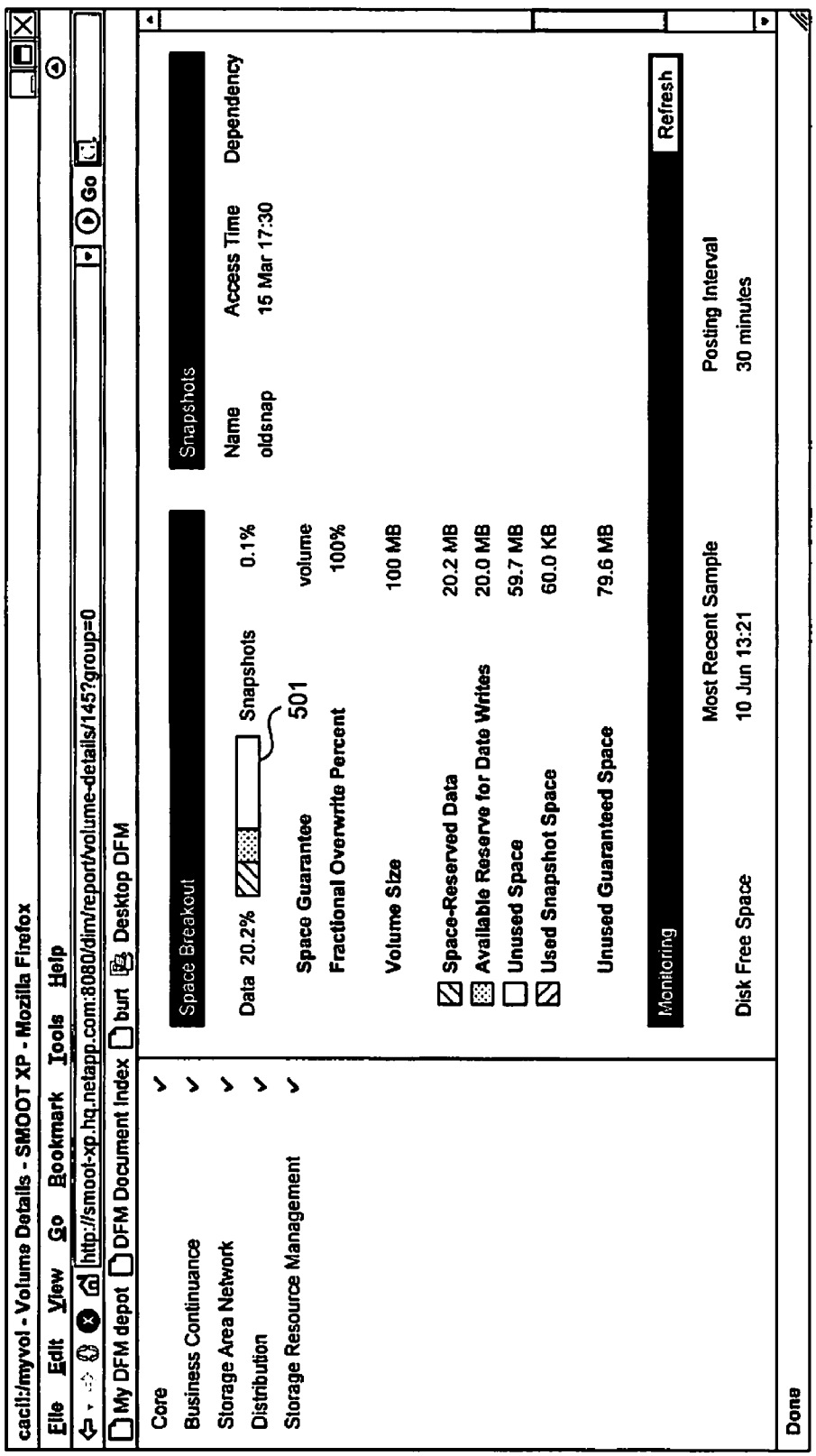
FIG. 5 shows a display screen of a GUI organizing and displaying information with respect to the detailed information of a volume.

Based on the information obtained above (including information with respect to the size of free space available to a volume, the volume's data overwriting rate, and size of the volume's PPIs), a storage administrator may predict whether a write failure to the volume is likely to occur. A prediction may also be done automatically by the monitoring module 6 shown in FIG. 2 based on a formula. For example, FIG. 3 is a flow diagram illustrating a process of predicting a write failure to a volume. At block 301, the process first determines how much free space is available to the volume. If there is no free space available to the volume, then the probability of a write failure to the volume is deemed to be 100%. If there is still free space available to the volume, the process determines what is the volume's daily data growing rate, or daily data overwriting rate if the volume is implemented as a write out-of-place system (at block 302). A volume's daily data growing rate may be obtained by monitoring the change of the size of the volume's used space daily and storing the daily change as statistical data in a database. The average daily data growing rate may be calculated based on the daily changes stored in the database. For a write out-of-place based volume, the daily data overwriting rate is roughly the same as the volume's daily data growing rate, and it may be calculated according to the way discussed above. Then, at block 303, the probability of a write failure to the volume may be calculated according to the following formula: $P=x/y*100\%$, where P is the probability of a write failure to the volume during the next 24 hours, x is the volume's daily data growing rate or daily data overwriting rate, y is the size of the volume's free space. For example, if a volume's daily data overwriting rate is 10 MB/day and the size of the volume's free space is less than 10 MB, the probability of a write failure sometime during the next 24 hours may be deemed to be 100%. Applying the formula, a prediction may be made automatically by the monitoring process. In an embodiment of the invention, at block 305, an event may be generated to warn the administrator of a risk of write failure if the probability is higher than a certain threshold, i.e., 50% (determined at block 304).

Yet in another embodiment, another way to predict whether a write failure will occur is to compare the percentage of free space on a volume with a predetermined threshold. For example, if the percentage of free space available on a volume is less than 1%, the threshold, then an alarm can be output to the storage administrator for a risk of writing failure.

5. Determining Whether a First PPI May be Created on a Volume

When a volume with write out-of-place property is created and the volume is expected to have PPIs, an overwrite reserve is to be allocated to the volume besides the originally estimated amount of space required for the volume. The reason is that the write out-of-place operating system writes all modified data to new locations on disk, instead of overwriting the old data, and old data will be held by PPIs of the volume. For example, if 100 MB is estimated to be needed by a LUN and a 100% overwrite reserve ratio is decided, the final volume size for the LUN is 200 MB (100 MB+100 MB*100%). Thus, for each byte of the LUN, there is an extra byte for it for overwriting purposes. Overwrite reserve, however, is only necessary for a write out-of-place file system with PPIs maintained, and the overwrite reserve for the file system must be large enough so that the risk of running out of space is kept as low as possible. Usually, a 100% overwrite reserve ratio is considered as a safe level. For a write out-of-place file system without PPIs, however, there is no such problem because data blocks which include data that has been overwritten may be released to become free blocks. Nevertheless, there may be situations that a user may want to start creating PPIs for a file system which is not originally created to hold any PPI. In order to determine whether the first PPI may be created on the file system, the amount of free space and the amount of used space of the volume are acquired from the storage server via an API call. Then, the maximum overwrite reserve ratio the volume can have will be the ratio of the amount of the free space and the amount of the used space of the volume. If this ratio is less than a predetermined threshold, i.e., 100%, then a first PPI is not allowed to be created on the volume because the risk of running out of space on the volume may be too high. Otherwise, creating a first PPI on the volume may be allowed.

Note that the term "reserve" means a logical reservation or to logically reserve storage blocks, not a physical reservation or to physically reserve storage blocks. Thus, a reserved block is not physically allocated for certain purpose, but may be used for holding original data, overwriting data, or even PPI data.

6. Other Metrics

Other metrics may also be obtained by calling the APIs of the storage server. These metrics may include, for example, the "overwrite reserve total", "overwrite reserve ratio", "overwrite reserve used", "overwrite reserve available", "PPI reserve total", "PPI reserve used", and "PPI reserve available", etc.

"Overwrite reserve total" is the total size of storage space logically reserved for overwriting purposes. "Overwrite reserve ratio" determines how large to make the "overwrite reserve total" relative to the size of the space reserved for an active file system in a volume. This ratio is usually set up when a volume is created. For example, if an active file system requires 100 MB and the "overwrite reserve ratio" is set as 50%, then the "overwrite reserve total" will be 100*50%=50 MB. "Overwrite reserve used" is the amount of space already used for overwriting purposes. "Overwrite reserve available" is the amount of space still available for overwriting purposes.

"PPI reserve total" is the amount of space reserved for storing PPIs of the active file system. "PPI reserve used" is the amount of space already used so far for storing PPIs. "PPI reserve available" is the amount of space still available for writing PPIs.

Generating Report for Monitoring a Storage Server

The following reports are examples of reports which may be generated to help a storage administrator monitor a storage server. For example, a report may be generated to report overwrite rate of each volume on a storage server. This report may include the following data items: volume name, name of the aggregate on which the volume resides, name of the storage server maintaining the volume, the volume's data overwrite rate, remaining free space from overwrite reserve available on the volume, etc.

A report for each volume's space reservation may also be generated. This report may include the following data items: volume name, name of the aggregate on which the volume resides, name of the storage server maintaining the volume, size of space-reserved files in the volume (a space-reserved file is a file having all storage space needed reserved already), overwrite reserve ratio (%), total space used for overwrites in this volume, free space available in volume, etc.

Sometimes an administrator would like to know how much space will need to be reserved when the first PPI is created on a volume. Thus, a report may be generated for this purpose. This report may include the following data items: volume name, name of the aggregate on which the volume resides, name of the storage server maintaining the volume, amount of space which will be reserved when first PPI is created, free space left in volume after the first PPI is created, free space left in aggregate after the first PPI is created, etc.

Furthermore, reports for monitoring the volume(s) on a storage server and the corresponding aggregate(s) may be useful for an administrator. For example, one such report may include the following data items: volume name, name of the aggregate on which the volume resides, name of the storage server maintaining the volume, the volume's space guarantee setting, the volume's size, the aggregate's size, amount of free space in the aggregate, etc.

Displaying Space Utilization in a Storage Server

Various types of data with respect to a storage server may be obtained by calling the API to the storage server or by the monitoring process discussed above. As shown in FIG. 2, these various types of data are stored in the database 61. A management console 5 operated by a storage administrator may send a request to the monitoring server 6 to access the data. The Web server 63 receives the request and retrieves the data from the database 61 via the Common Gateway Interface (CGI) 62. After receiving the data, the Web Server 63 generates a GUI page and sends the page to the console 5. The following section discusses the detail of how to organize and display these various types of data via a GUI.

FIG. 4 shows a display screen of a GUI organizing and displaying information with respect to a list of volumes' data overwrite rate. Such a screen may be displayed by the monitoring server 6 and displayed on management console 5 (as shown in FIG. 2). As shown in the figure, column 401 lists all of the volumes that are being monitored, column 402 lists the aggregate associated with each corresponding volume, column 403 displays the storage server on which each corresponding volume resides, column 404 displays the overwrite rate, column 405 displays free space available to each corresponding volume, and column 406 displays the estimated length of time within which the corresponding volume will be full. Thus, an administrator may easily identify from the screen a volume which is in danger of a write failure soon. In addition, by clicking on any volume, the volume's detail information will be shown in a new screen. For example, FIG.

5 shows a display screen of a GUI organizing and displaying information with respect to the detailed information of a volume. As shown, the overall space usage of the volume is displayed as a bar 501 with shaded areas, each representing different data area, i.e., data, Snapshots, etc. One of the features of the bar graph presentation is that it displays different values based on the state of the volume. For example, if the volume does not contain LUNs, it shows the above described. If the volume does contain LUNs but not normal files, it omits the bar for normal files and adds segments for LUN space and the LUN overwrite reserve.

Figure 6:
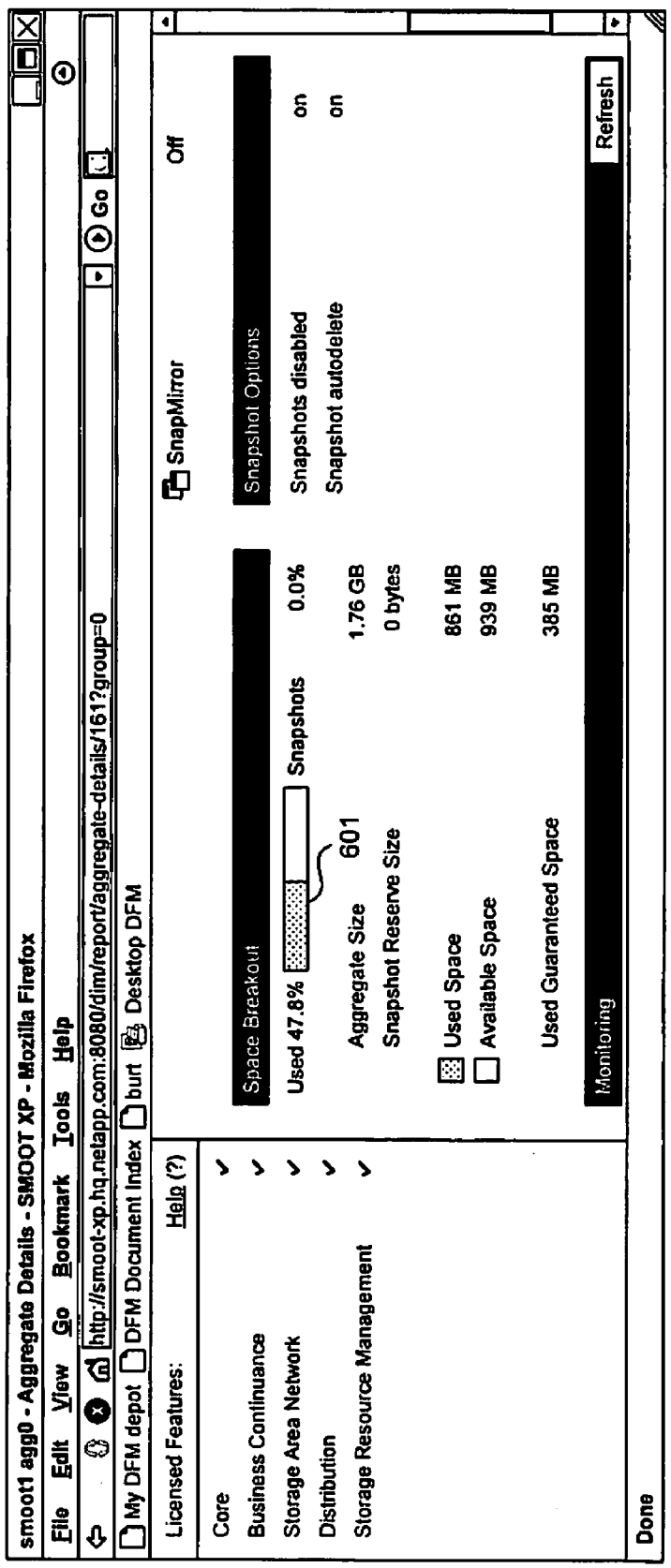
FIG. 6 shows a display screen of a GUI organizing and displaying information with respect to the detailed information of an aggregate.

Similarly, by clicking on the link of an aggregate on the screen shown in FIG. 4, a screen with detailed information about the aggregate will be displayed as shown in FIG. 6, where a graphic bar 601 is used to plot the use of space on the aggregate.

Figure 7:
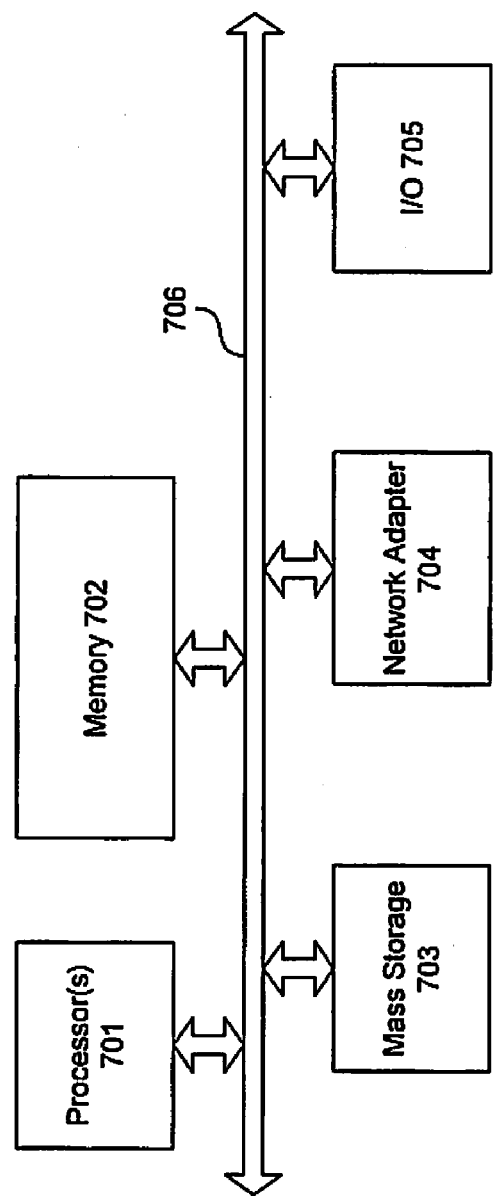
FIG. 7 is a high-level block diagram of a computer system that can be used as a monitoring server.

FIG. 7 is a high-level block diagram of a computer system that can be used as the monitoring server 6 such as described below. The illustrated system includes processor(s) 701, i.e. a central processing unit (CPU), memory(s) 702, and, which may be coupled to each other by a bus system 706. The bus system 706 includes one or more buses or other connections, which may be connected to each other through various bridges, controllers and/or adapters, such as are well-known in the art. Also coupled to the bus system 706 are mass storage(s) 703, Input/Output device(s) 705 and network adapter(s) 704. It will be understood that the system may include other conventional devices that are not germane to this description and which are not shown, as it is not necessary to show all in order to understand the present invention.

Thus, a method and apparatus for automatically monitoring a storage server have been described.

Software to implement the techniques introduced here may be stored on a machine-readable medium, such as 702 and/or 703 in FIG. 7. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   remotely communicating with a storage server that maintains a write-out-of-place file system, the file system including an active file system and a persistent point-in-time image (PPI) of the active file system, wherein the PPI includes a reference to at least part of the active file system when the PPI is created, but does not duplicate said part of the active file system; and
   automatically monitoring utilization of storage space of the file system, including:
      automatically determining a data overwriting rate of the file system;
      automatically monitoring free space available to the file system; and
      calculating a probability of a write failure to the file system occurring within a specified unit of time, based on the data overwriting rate and the free space available to the file system, wherein the probability of a write failure to the file system occurring within the specified unit of time is defined as x/y, wherein x is the data overwriting rate of the file system and y is an amount of free space of the file system.

2. The method of claim 1, further comprising automatically determining whether the PPI may be deleted.

3. The method of claim 1, wherein the file system comprises a flexible volume, and said automatically monitoring utilization of storage space of the file system comprises:
   checking the amount of used space of the flexible volume and the amount of free space on the storage server; and
   predicting whether a write failure to the flexible volume will occur.

4. The method of claim 1, wherein said remotely communicating with a write out-of-place file system in a storage server comprises:
   periodically requesting and receiving, from the storage server, data related to utilization of storage space of the write out-of-place file system; and
   each time the requested data is received, storing said requested data in a database.

5. The method of claim 1, further comprising:
   generating a Graphical User Interface (GUI) to display information with respect to the file system upon a request from a remote processing system, the GUI comprising:
   a graphical bar including a first shaded area with a first length representing the active file system, a second shaded area with a second length representing a persistent point-in-time image (PPI) area of the file system, and a blank area representing free space of the file system.

6. A machine-readable storage medium having sequences of instructions stored therein which, when executed by a processor, cause the processor to perform a process comprising:
   requesting and receiving, from a storage server, data with respect to status of a file system with a write out-of-place property in the storage server, wherein the file system includes an active file system and at least one persistent point-in-time image (PPI) of the active file system, each PPI including the same physical data blocks of the active file system as of an instant in time when the PPI was created; and
   automatically determining whether the file system has enough free space, including:
      calculating a probability of a write failure to the file system occurring within a specified unit of time based on a data overwriting rate of the file system and an amount of free space available to the file system, wherein the probability of a write failure to the file system occurring within the specified unit of time is defined as x/y, wherein x is the data overwriting rate of the file system and y is an amount of free space of the file system; and
      determining whether the probability is greater than a predetermined threshold; and
   if the probability is greater than a predetermined threshold, generating an event to warn a storage administrator of a lack of sufficient free space.

7. A processing system comprising:

a processor; and a memory coupled to the processor, the memory storing instructions which when executed by the processor, cause the processing system to perform a process comprising:

periodically communicating, via a network, with an operating system of a storage server to request and receive, remotely, data with respect to a status of a file system on the storage server, wherein the operating system implements the file system as a write out-of-place file system; and analyzing received data from said operating system to calculate a probability of a write failure to the file system occurring within a specified unit of time based on a data overwriting rate of the file system and an amount of free space available to the file system, wherein the probability of a write failure to the file system occurring within the specified unit of time is defined as x/y, wherein x is the data overwriting rate of the file system and y is the amount of free space of the file system.

8. The processing system of claim 7, wherein the file system comprises a data set and a persistent point-in-time image (PPI) of the data set, wherein the PPI of the data set shares at least some physical storage with the data set when the PPI is created.

9. The processing system of claim 7, wherein the process further comprises:

determining whether the probability of a write failure to the file system is greater than a predetermined threshold; and if the probability is greater than the predetermined threshold, generating an event to warn a user of a risk of write failure.

10. The processing system of claim 7, wherein the file system comprises a flexible volume, wherein said data with respect to the status of the file system on the storage server also includes an amount of free space available on the storage server.

11. The processing system of claim 7, wherein the process further comprises:

generating a Graphical User Interface (GUI) to display information with respect to the storage server upon a request from a remote processing system, the GUI comprising:

a list, wherein each element of the list represents a corresponding file system of the storage server, and each element comprises:

a first item representing a name of the corresponding file system, a second item representing a name of an aggregate associated with the corresponding file system, a third item representing a data overwriting rate of the corresponding file system, a fourth item representing the amount of free space available to the corresponding file system, and a fifth item representing an estimated period of time within which a write failure to the corresponding file system will occur.

12. The processing system of claim 7, wherein the process further comprises determining whether a persistent point-in-time image (PPI) of the file system may be created.

13. The processing system of claim 7, wherein the process further comprises generating a report, the report including a name representing the file system and a data overwriting rate of the file system.

14. The processing system of claim 7, wherein the process further comprises generating a report, the report including a name representing the file system and the amount of space of the file system used for overwriting purpose.

15. A method comprising:

in a storage server monitoring application executing on a network server, communicating with a separate storage server that maintains a write out-of-place file system, the file system comprising an active file system and a persistent point-in-time image (PPI) of the active file system, wherein the PPI includes a reference to at least part of the active file system when the PPI is created, but does not duplicate said part of the active file system; and automatically monitoring utilization of storage space of the file system, including:

automatically determining a data overwriting rate of the file system;

automatically monitoring free space available to the file system; and calculating a probability of a write failure to the file system occurring within a specified unit of time, based on the data overwriting rate and the free space available to the file system, wherein the probability of a write failure to the file system occurring within the specified unit of time is defined as x/y, wherein x is the data overwriting rate of the file system and y is an amount of free space of the file system;

when the probability exceeds a threshold, outputting an event indication to a user to indicate that a lack of sufficient free space exists; and in response to a request from a remote processing system, generating and sending to the remote processing system a graphical display containing information about file system storage utilization by the storage server, the graphical display including a graphical object having a first portion with a size representing an active file system of the storage server, a second portion with a size representing a persistent point-in-time image (PPI) area of the file system, and a third portion representing free space of the file system.

* * * * *